United States Patent [19]
Marshall

[11] 4,215,483
[45] Aug. 5, 1980

[54] DRILL SHARPENING GAUGE

[76] Inventor: Wilbur A. Marshall, Rt. 2, Box 96 C, Aurora, Mo. 65605

[21] Appl. No.: 9,662

[22] Filed: Feb. 5, 1979

[51] Int. Cl.³ .............................................. G01B 5/20
[52] U.S. Cl. .................................... 33/201; 33/174 F
[58] Field of Search ............................ 33/201, 174 E

[56] References Cited
U.S. PATENT DOCUMENTS
3,482,325  12/1969  Mitchell ................................ 33/201

Primary Examiner—Willis Little
Attorney, Agent, or Firm—Merlin B. Davey

[57] ABSTRACT

This invention relates to a drill sharpening gauge which can be positioned close to an abrasive motor-driven wheel so that the operator can quickly check the length of the edges of the drill bit at the tip of the drill to insure that both cutting edges are the same length, and thus the angles are equal.

2 Claims, 2 Drawing Figures

DRILL SHARPENING GAUGE

BACKGROUND OF THE INVENTION

When sharpening drill bits, such as with an abrasive wheel, it is essential that, for a given size drill, both edges are angled away from the tip at the same angle so that the drill will cut into the workpiece straight and true.

Various tool gauges have been described in the art, such as, for example, in U.S. Pat. Nos. 2,778,122; 2,547,284; 1,506,618 and 51,248. None of these previously described gauges provide a means whereby the cutting edge of a tool in the process of being sharpened can be checked with a measured section of a scale without using at least one hand to pick up and hold the guage.

SUMMARY OF THE INVENTION

This invention provides a drill point gauge comprising a rod having a first end and a second end, a portion of said first end being inscribed with a calibrated scale at least partially encircling said rod and conforming to the sizes of drills; a portion of said second end being threaded, said guage having a movable stop encircling and threadably engaging said threaded portion of said second end of said rod; said stop having a beveled face angled away from said first end and registering on said scale.

DESCRIPTION OF THE DRAWINGS

The invention will be further understood by reference to the accompanying drawing, wherein FIG. 1 is an isometric view of the entire assembly.

Referring to FIG. 1, the drill point gauge of this invention comprises a rod 10 having a first end 11 and a second end 12. A portion of end 11 is inscribed with a calibrated scale at least partially encircling rod 10 and conforming to the sizes of drills. A portion of end 12 is threaded. If desired, a longitudinal line, not shown, may be cut in end 11 of rod 10 to facilitate the alignment of the drill against the gauge.

Figure 1:
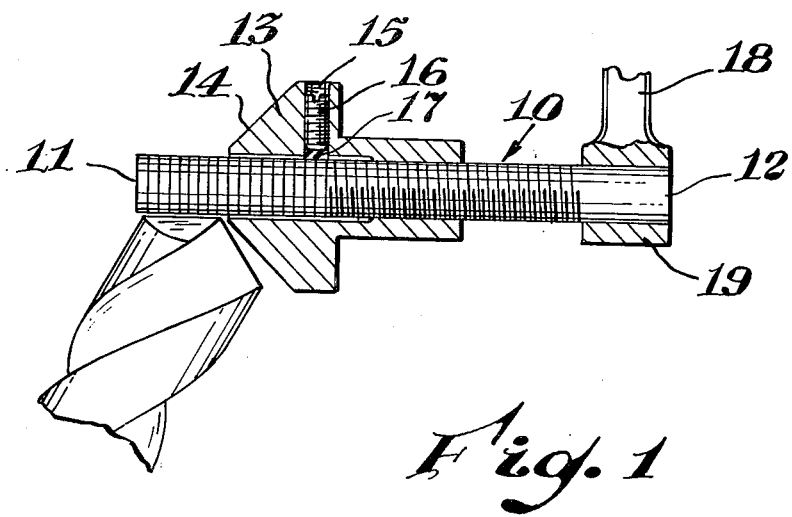
FIG. 1 is a side view, partly in section of a portion of the drill point gauge of this invention.

The drill gauge includes a movable stop 13, encircling and threadably engaging end 12 of rod 10. Stop 13 has a face 14 which is angled away from end 11 of rod 10 and which is indexed to register with the scale on end 11 of rod 10. Stop 13 defines a threaded bore 15 having a set screw 16 disposed therein and adapted to contact rod 10. The set screw 16 has a resilient member or portion 17 disposed on the end thereof, which is in contact with rod 10.

Figure 2:
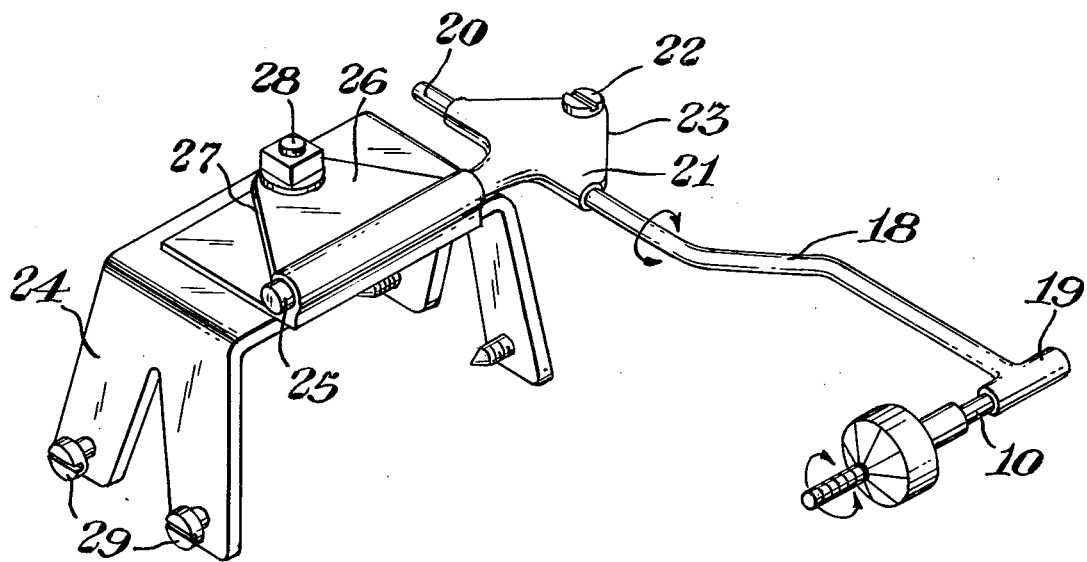

Referring to FIG. 1, the drill point gauge is adapted to be mounted on a support 24 by means of a mounting arm 18 having a first end 19 and a second end 20. First end 19 of arm 18 grips end 12 of rod 10 using a tight fitting sleeve. Second end 20 is engaged by a clamping means 21, which comprises a sleeve having extended lips 23, which are tightenable by means of a threaded bolt or screw 22, which engages the extended lips 23. A mounting portion, which may be a rod or stem 25, extending from clamp 21 permits the attachment of clamp 21 to a second clamping means 26, which also comprises extended lips 27 and turnably accommodates a threaded, adjusting and anchoring bolt or screw 28 by means of which clamping means 26 is attached to support 24. Clamping means 21 and 26 provide a universal joint which permits ready positioning of the drill point gauge at any desired location. Support 24 may be adapted to fit over the top of an abrasive wheel guard and may be equpped with pointed hardened screws 29, which serve to anchor the support where desired. Support 24 is advantageously in the shape of a saddle-type clamp, as shown in FIG. 2.

All connections in this gauge assembly are advantageously of the tightenable sleeve type so one can achieve a degree of rigidity in the position of the gauge when in use, and still allow it to be pushed out of the way and returned for use without any further adjusting, once it has been correctly installed.

Various modifications may be made in the present invention without departing from the spirit or scope thereof, and it is understood that I limit myself only as defined in the appended claims:

I claim:

1. Mounting device for a caliper gauge comprising a mounting arm and a clamping means, said mounting arm having a first end and a second end, the first end operatively engaging said caliper gauge and said second end being operatively engaged by said clamping means, said clamping means comprising a first and a second tightenable sleeve, said first sleeve directly engaging said mounting arm, said first sleeve having a mounting portion; said second sleeve engaging the mounting portion of said first sleeve; said second sleeve being rotatably mounted on a support which is adapted to be connected to the guard of a motor-driven abrasive wheel, thereby permitting controlled rotatable horizontal and vertical movement of said arm.

2. Device of claim 1 wherein the support is adapted to be connected to the guard of a motor-driven abrasive wheel with pointed hardened screws.

* * * * *